(12) United States Patent
Schaal

(10) Patent No.: US 11,312,282 B2
(45) Date of Patent: Apr. 26, 2022

(54) HOLDER FOR A BEVERAGE CONTAINER

(71) Applicant: Fischer automotive systems GmbH & Co. KG, Horb a.N. (DE)

(72) Inventor: Falk Schaal, Loßburg (DE)

(73) Assignee: fischer automotive systems GmbH & Co. KG, Horb a.N. (DE)

( * ) Notice: Subject to any disclaimer, the term of this patent is extended or adjusted under 35 U.S.C. 154(b) by 0 days.

(21) Appl. No.: 17/188,493

(22) Filed: Mar. 1, 2021

(65) Prior Publication Data

US 2021/0284054 A1    Sep. 16, 2021

(30) Foreign Application Priority Data

Mar. 13, 2020 (DE) .................... 10 2020 106 886.7
Jan. 13, 2021 (DE) .................... 10 2021 100 552.3

(51) Int. Cl.
*A47K 1/08* (2006.01)
*B60N 3/10* (2006.01)

(52) U.S. Cl.
CPC .................................... *B60N 3/105* (2013.01)

(58) Field of Classification Search
CPC ................................ B60N 3/105; F16M 11/02
See application file for complete search history.

(56) References Cited

U.S. PATENT DOCUMENTS

| | | | | |
|---|---|---|---|---|
| 5,102,085 A * | 4/1992 | Wieczorek | ............ | B60N 3/102 224/926 |
| 5,174,534 A * | 12/1992 | Mitchell | ............... | B60N 3/103 215/395 |
| 5,483,808 A * | 1/1996 | Barbazza | ............... | A44C 9/003 63/15.4 |
| 5,862,932 A * | 1/1999 | Walsh | .................. | B65D 21/086 220/8 |
| 6,834,838 B2 * | 12/2004 | Dennis | ................... | B60N 3/102 248/311.2 |
| 7,036,700 B2 * | 5/2006 | Engel | ..................... | B60N 3/106 224/501 |
| 7,455,341 B2 * | 11/2008 | Miyashita | ............. | B60N 3/105 296/37.12 |
| 7,757,888 B2 * | 7/2010 | Ogura | .................... | B60N 3/102 220/737 |

(Continued)

FOREIGN PATENT DOCUMENTS

DE          101 01 642 A1     7/2002
DE   10 2004 021 685 A1    11/2005
(Continued)

OTHER PUBLICATIONS

Search Report for related German Application No. 10 2020 106 887.5, dated Nov. 19, 2020.

*Primary Examiner* — Amy J. Sterling
(74) *Attorney, Agent, or Firm* — Renner, Otto, Boisselle & Sklar, LLP

(57) ABSTRACT

A holder for holding, for example, a beverage can, in a tilt-proof manner, in a motor vehicle is designed with two rings that are disposed concentrically inside one another, serving as supports (7), which can be consecutively raised and lowered by rotating a control sleeve comprising radial cams. By raising only the larger ring, the holder is suitable for a beverage can having a larger diameter, and by raising both rings, it is suitable for a beverage can having a smaller diameter.

10 Claims, 11 Drawing Sheets

(56) References Cited

U.S. PATENT DOCUMENTS

| | | | | |
|---|---|---|---|---|
| 8,042,780 B2* | 10/2011 | Wagner | ................ | B60N 3/102 |
| | | | | 248/311.2 |
| 8,267,271 B2* | 9/2012 | Faris | ................ | B65D 21/08 |
| | | | | 220/8 |
| 8,439,438 B2* | 5/2013 | Oldani | ................ | B60N 3/102 |
| | | | | 297/188.14 |
| 8,474,772 B2* | 7/2013 | Miklas | ................ | B60N 3/107 |
| | | | | 248/286.1 |
| 10,576,905 B1* | 3/2020 | MacNeil | ................ | H04B 1/3877 |
| 2012/0248106 A1* | 10/2012 | Marta | ................ | B65D 21/086 |
| | | | | 220/8 |
| 2020/0180490 A1* | 6/2020 | Benliyan | ................ | B60N 3/105 |

FOREIGN PATENT DOCUMENTS

| | | |
|---|---|---|
| DE | 10 2008 048 212 A1 | 3/2010 |
| DE | 10 2017 128 052 A1 | 5/2019 |

* cited by examiner

HOLDER FOR A BEVERAGE CONTAINER

This application claims priority under 35 USC § 119 to German Patent Application Nos. DE 10 2020 106 886.7 and DE 10 2021 100 552.3, filed Mar. 13, 2020 and Jan. 13, 2021, respectively, the entire disclosures of which are incorporated herein by reference.

TECHNICAL FIELD OF THE INVENTION

The invention relates to a holder for a beverage container. Such holders are used to hold a beverage container in the most tilt-proof manner possible in a motor vehicle. The holders are typically installed into a center console of the motor vehicle. Beverage containers are cups, mugs, bottles and beverage cans, for example.

DISCUSSION OF THE RELATED ART

Unexamined patent application DE 10 2008 048 212 A1 describes such a holder, including a bowl-shaped housing, having an opening that forms an insertion opening for placing a beverage container into the holder. Two rings, having differently sized inside diameters, are vertically movably disposed in the housing, and are pulled upward by rubber grommets to the height of the insertion opening of the housing. The two rings form supports, which enclose a beverage container placed into the housing, wherein central holes of the two rings form smaller insertion openings than the insertion opening of the housing. When a beverage container having a small diameter is placed into the known holder, the two rings remain at the top, at the insertion opening of the housing, and the ring having the small diameter laterally supports the beverage container. A beverage container having a medium-sized diameter, when placed into the known holder, pushes the ring having the smaller diameter downward, and is laterally supported by the ring having the larger diameter. A beverage container having a large diameter, when placed into the holder, pushes the two rings downward, and is laterally supported by the insertion opening of the housing of the holder.

It is the object of the invention to provide a holder for a beverage container that can adapt to beverage containers having different diameters.

SUMMARY OF THE INVENTION

The holder for a beverage container according to the invention is provided for holding a beverage container, such as a beverage can, a cup, a bottle or a mug, in the most tilt-proof manner possible, in particular in a motor vehicle. This includes a bottom element onto which the beverage container can be placed, and multiple, height-adjustable supports having differently sized insertion openings for the beverage container. The bottom element is a placement area or a linear or punctiform bearing surface or the like, on which the beverage container placed into the holder sits. In a usage position, the supports enclose, or in any case support, the beverage container laterally at a sufficiently large number of circumferential points that the beverage container is held in the most tilt-proof manner possible. "Height-adjustable" means that a vertical distance between the supports and the bottom element is adjustable. "Vertical" here refers to the typical installation position of a holder for beverage containers. The holder is in a "usage position" when at least one of the supports is raised or lowered in relation to the bottom element such that the beverage container placed, in the insertion opening, onto the bottom element, is laterally supported by the at least one support.

The insertion openings overlap one another, so that a beverage container, having a diameter that is not greater than an inside width of the smallest insertion opening, can be placed through the insertion openings of all the supports onto the bottom element of the holder. In particular, the insertion openings are concentric with respect to one another. In relation to adapting to beverage containers having different diameters, the insertion openings of the supports have different diameters or, generally speaking, different inside widths.

The holder according to the invention includes a support drive, which consecutively raises the supports in order to set the usage position, in the order of the sizes of the insertion openings thereof, above the bottom element and/or lowers these to the bottom element. The support having the smallest insertion opening which is raised above the bottom element laterally supports the beverage container placed, through the insertion opening, onto the bottom element. In order to hold the beverage container in the most tilt-proof manner possible, the support having the smallest insertion opening, through which the beverage container can be placed onto the bottom element, is raised above the bottom element, so as to laterally support the beverage container at a vertical distance above the bottom element, to prevent tilting. "In the order of" means that the support having the smallest or the largest insertion opening is raised or lowered first, followed by the support having the next larger or next smaller insertion opening. The raising and lowering take place in the form of a relative movement between the bottom element and the supports. As a result, the bottom itself may be rigid or movable with respect to the surrounding contour.

The supports are preferably tubular or annular, wherein these may be closed in the circumferential direction or include one or more discontinuities. Discontinuities are preferably smaller than a diameter or an inside width of the respective insertion opening, so that an inserted beverage container is laterally supported from all directions, and cannot pass through a discontinuity.

In another preferred embodiment of the invention, each of the supports can be raised or lowered equally far into the usage position. This means that, when the individual supports are being raised above the bottom, each of the individual supports can be raised by an identical distance with respect to the bottom. When the individual supports are being lowered to the bottom, the individual supports are lowered by an identical distance with respect to the bottom. In this way, each of the individual supports can effectively laterally support a beverage container inserted into the insertion opening to the same extent.

In another advantageous embodiment of the invention, each of the individual supports alone, in the respective usage position, forms the supporting surface, and more particularly preferably such that the supporting surface, in a usage position, projects from the bottom element to an upper edge of the respective support. In particular, the annular or tubular supports in each case form closed cylindrical supporting surfaces having differing cylinder diameters, whereby the beverage containers, which likewise usually have a circular cross-section, can be laterally supported across the entire circumference. In this way, in the usage position, an effective stepless supporting surface is formed by only one of the supports. This means that, in the inserted usage position when a beverage container is placed on the bottom, this is exclusively supported by the effective supporting surface of the support having the smallest diameter. In the usage position, the further supports are disposed such that the effective supporting surface is stepless, which is to say that the further supports do not contribute to supporting the beverage container. The stepless effective supporting surface prevents an inserted beverage container from tipping in the insertion opening. This problem arises with telescopic devices, as is disclosed in unexamined patent application DE 10 2004 021 685 A1, for example. In this device, the effective supporting surface is stepped, and the beverage container can consequently tip, in particular when used improperly.

So as to prevent foreign bodies from being able to pass through the insertion opening into the interior of the holder, in another advantageous embodiment of the invention, the insertion opening is substantially gap-free in the usage position. "Substantially" means that the individual supports cooperate, in particular in a sliding fit-like manner, whereby no gap can arise between the supports. In addition, the bottom element, which is in particular circular, is movable in a clearance fit-like manner in relation to the support having the smallest insertion opening, whereby a gap is avoided. In this way, it is ensured that foreign bodies, such as dust, particles or liquids, cannot find their way between the bottom element and the support having the smallest insertion opening, into the interior of the holder, which could result in a malfunction of the entire mechanism of the holder.

In a preferred embodiment of the invention, the support drive includes a cam control unit for raising and/or lowering the supports. According to a refinement of the invention, a control sleeve surrounding the insertion opening is provided, which can be rotated about an axis that extends through the insertion openings and, preferably, is concentric with respect to the insertion openings. The control sleeve or the supports can include radial cams for raising and/or lowering the supports. The respective other element, which is to say the supports or the control sleeve, include control elements engaging in the radial cams or, generally speaking, engaging on the radial cams, which, during a rotation of the control sleeve, cause the raising and/or lowering of the supports in the order of the sizes of the insertion openings thereof.

For aesthetic reasons and also to prevent foreign bodies from finding their way into the interior of the holder, according to one configuration of the invention, the supports, together with the bottom element, form a closed surface area when the insertion openings thereof are located at the same height as the bottom element. The supports, so-to-speak, include annular panels enclosing the bottom element, for example, which, when the holder is not in use, can be brought to the same height as the bottom element, and preferably also flush with an upper side of a center console of a motor vehicle or the like, into which the holder is installed.

In particular, the invention provides an electromotive support drive, which is to say, for example, a rotary drive of the aforementioned control sleeve, including an electric motor using a gear box.

The features and feature combinations, designs and embodiments of the invention mentioned above in the description, and the features and feature combinations mentioned hereafter in the description of the figures and/or shown in a figure, can be used not only in the respective indicated or illustrated combinations, but also in other essentially arbitrary combinations, or alone. Embodiments of the invention that do not include all the features of a dependent claim are possible. It is also possible to replace individual features of a claim with other disclosed features or feature combinations. Embodiments of the invention are possible that do not include all the features of the exemplary embodiment or exemplary embodiments, but an essentially arbitrary portion of the characterizing features of one exemplary embodiment, optionally in combination with one, more or all the features of one or more further exemplary embodiments.

BRIEF DESCRIPTION OF THE DRAWINGS

The invention will be described in more detail hereafter based on two exemplary embodiments shown in the drawings. In the drawings.

DETAILED DESCRIPTION OF THE INVENTION

Figure 1:
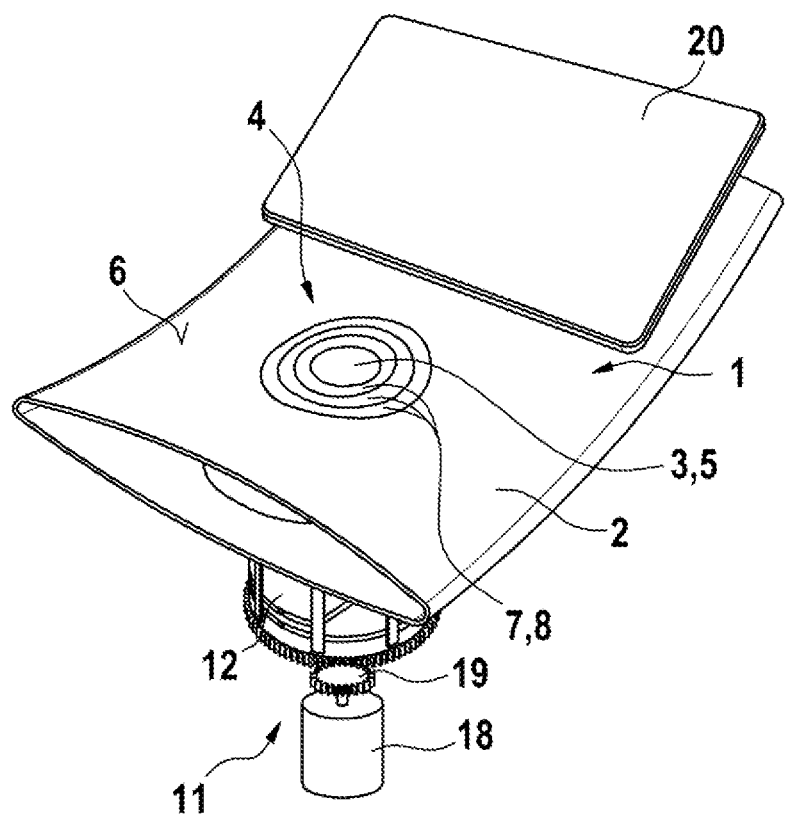
FIG. 1 shows a holder according to the invention for a beverage container in a closed position in a perspective illustration.

The holder 1 shown in FIGS. 1 to 5 is intended to be installed in a center console 2, for example, of a motor vehicle, which is not shown. This is used to hold a beverage container (not shown), such as a beverage can, a cup, a bottle or a mug, in the most tilt-proof manner possible.

The holder 1 includes a fixed, cylindrical foot 3 in the center of a hole 4, wherein an upper end face of the foot 3 forms a bottom element 5, which is flush with a surface 6 of the holder 1 and the center console 2 surrounding the hole 4.

Figure 2:
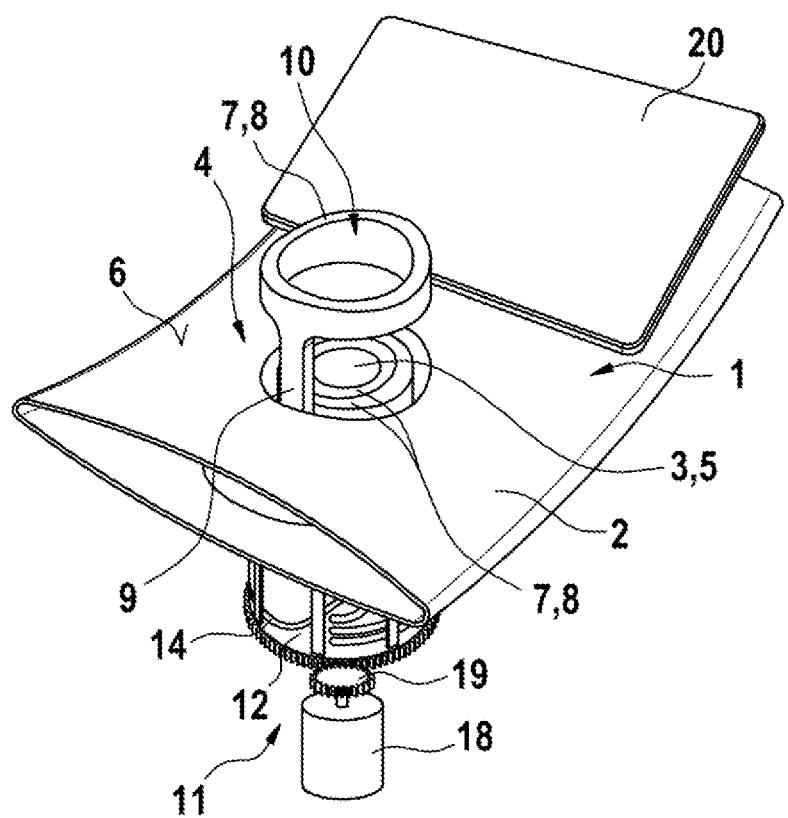
FIG. 2 shows the holder from FIG. 1 with a raised support.
Figure 3:
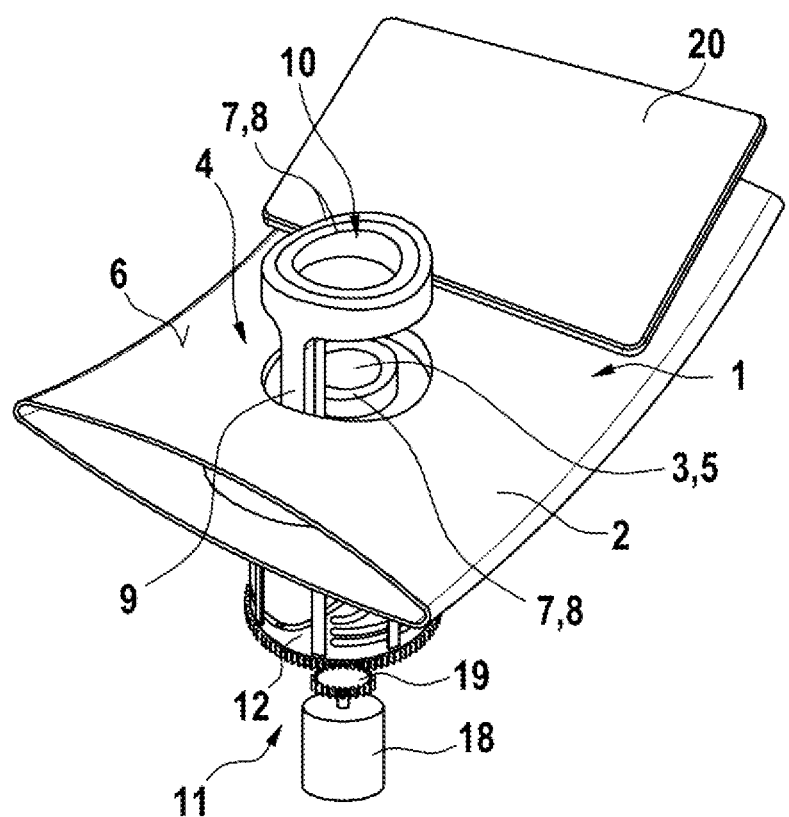
FIG. 3 shows the holder from FIG. 1 with two raised supports.
Figure 4:
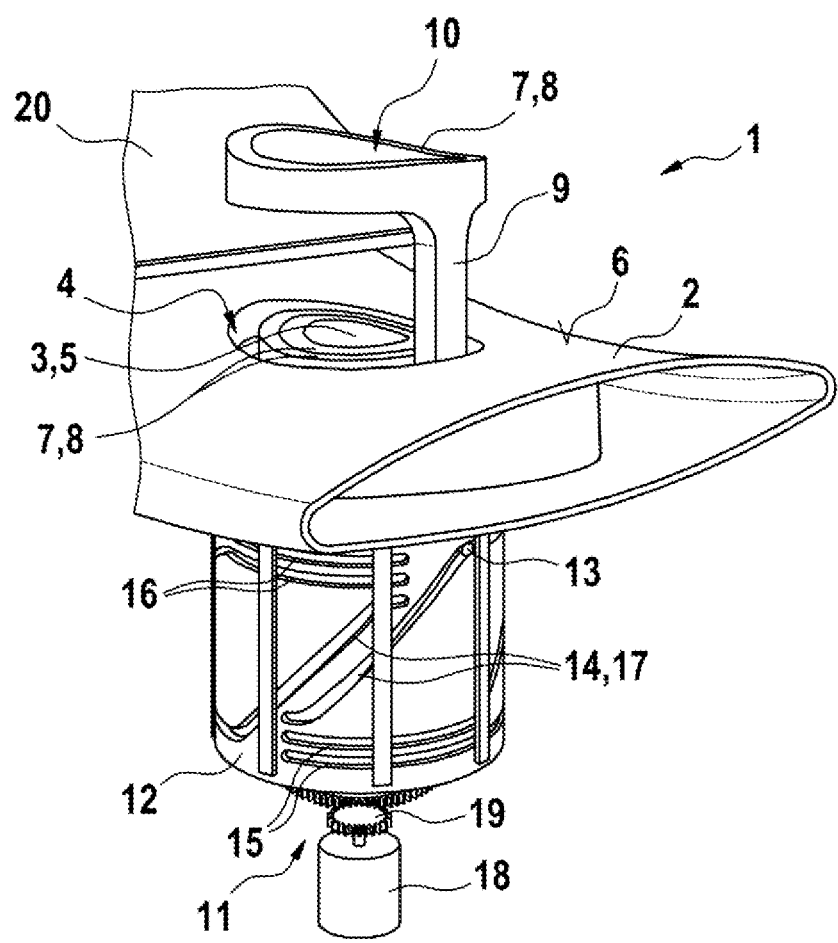
FIG. 4 shows the holder from FIG. 2 with a changed viewing direction.
Figure 5:
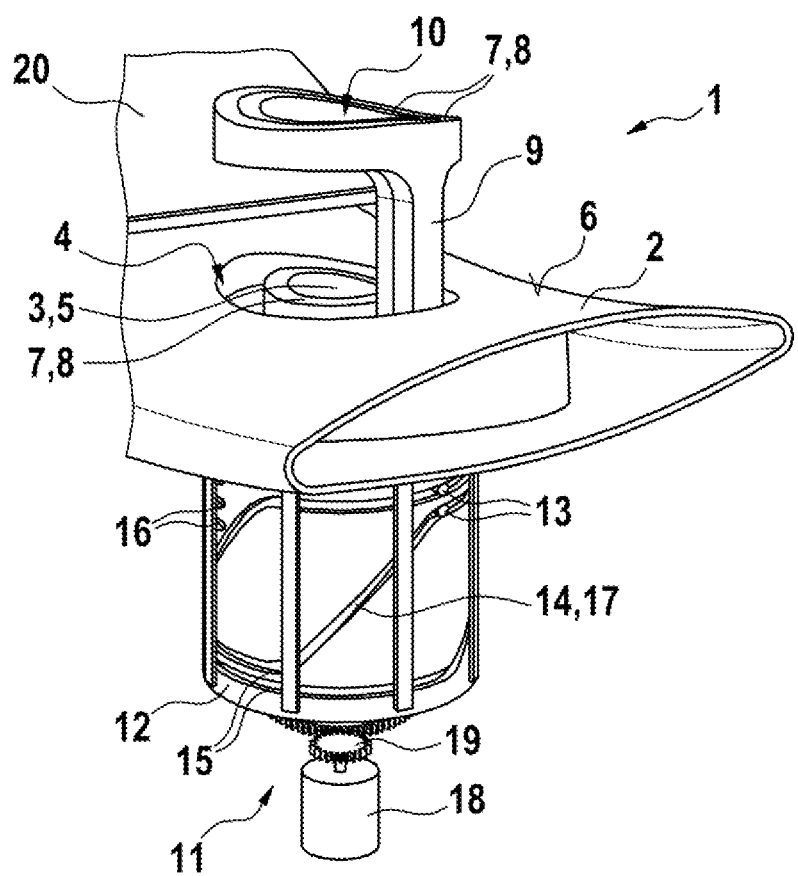
FIG. 5 shows the holder from FIG. 3 with a changed viewing direction.
Figure 6:
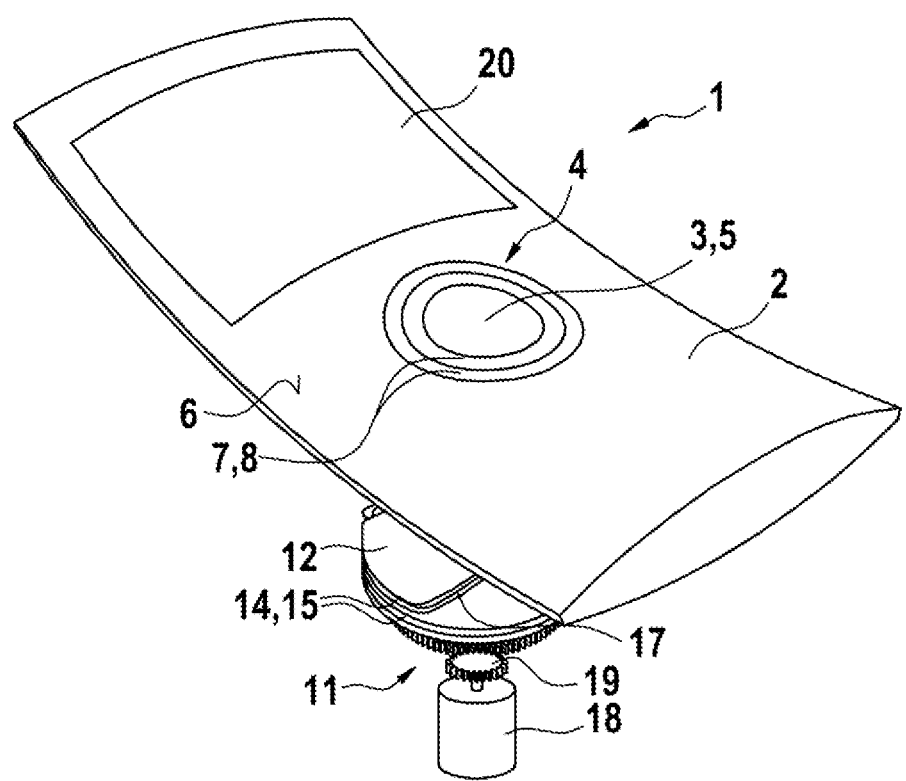
FIG. 6 shows a second exemplary embodiment of a holder according to the invention for a beverage container in a closed position in a perspective illustration.

The foot 3 is surrounded by, in the exemplary embodiment, three supports 7, which include differently sized rings 8 (small, medium-sized, large) on webs 9. The rings 8 are located in radial planes with respect to the foot 4 and are concentric with respect to the foot 4. In other words, the rings 8 are parallel and concentric with respect to the bottom element 5. The rings 8 are disposed at upper ends of the webs 9, which extend in an axially parallel manner to the foot 3 and are displaceably guided in a manner axially parallel to the foot 3, by way of a sliding guide, which is not visible in the drawing. In this way, the rings 8 are axially displaceable with respect to the foot 3 and the bottom element 5, and can be moved from a lowered position, shown in FIG. 1, in which the holder 1 is in a "non-usage position," into a raised position, shown in FIGS. 2 to 5, in which the holder 1 is in a "usage position." Differently sized holes, enclosed by the rings 8, form differently sized insertion openings 10. When the supports 7 are raised, the beverage container (not shown) can be placed through the insertion openings 10 onto the bottom element 5, so that the rings 8 or the supports 7 laterally support the beverage container to prevent tilting. Each of the supports 7, or more precisely each of the corresponding rings 8, forms a fullsurface-area cylindrical supporting surface, which is to say forms the supporting surface alone in the respective usage position. In this case, this means that each of the supports 7, together with the corresponding rings 8, offers equally effective support for a beverage container. In other words, the smallest ring 8 laterally supports a beverage container having a small diameter just as effectively as the largest ring 8 supports a beverage container having an accordingly larger diameter. If, as is indicated in FIGS. 2 and 4, only the large ring 8, which is to say the support 7 having the large insertion opening 10, is raised, a beverage container having a larger diameter can be placed into the holder 1 according to the invention. If, as is indicated in FIGS. 3 and 5, the large and medium-sized rings 8, or the large and medium-sized supports 7, are raised, a beverage container having a smaller diameter is better supported to prevent tilting in the medium-sized ring 8, which is to say in the support 7 having the medium-sized insertion opening 10. The advantage of the holder 1 is that each of the supports 7 or rings 8, respectively, can be raised or lowered equally far into the usage position. This becomes apparent from a comparison of FIGS. 2 and 3. In FIG. 2, the large ring 8 is raised. The other supports 7 are located in the non-usage position. In FIG. 3, the medium-sized ring 8 is raised, in addition to the large ring 8, and more particularly flush with the large ring 8. In this way, both supports 7 cover an identical "travel distance," and each of the supports 7 or rings 8, respectively, can laterally effectively support a beverage container placed into the insertion opening 10 to the same extent. In the usage position, an effective stepless supporting surface is always formed by only one of the supports 7. In other words, only one of the supports 7 at a time rests against the beverage container to be held, thereby avoiding steps, as is the case with telescopic holders.

The supports 7 are raised and lowered by way of an electromechanical support drive 11, which is described hereafter. For example, tubular supports are also possible, such as are shown in the second exemplary embodiment according to the invention, instead of the supports 7 including the rings 8. More than three supports are also possible (not shown).

The support drive 11 includes a cylindrical tube-shaped control sleeve 12, which can be rotated about the axis thereof and is disposed concentrically with respect to the foot 3, including the bottom element 5, and with respect to the supports 7, or the rings 8 thereof, in the center console 2 beneath the surface 6. An inside diameter of the control sleeve 12 is as large as an outside diameter of the larger of the two rings 8, so that the webs 9 are located in the control sleeve 12. Tenons, serving as control elements 13, each project outwardly from the webs 9, close to bottom ends. The control elements 13 engage in slots in the control sleeve 12, which form three radial cams 14. As is apparent from FIGS. 4 and 5, the radial cams 14 in each case include two end sections 15, 16 extending in the circumferential direction, which are connected by oblique, or to be precise helical, center sections 17. The center sections 17 of the radial cams 14 are offset with respect to one another in the circumferential direction. When the control elements 13 are located in the lower end sections 15 of the radial cams 14, the supports 7 are lowered, as is illustrated in FIG. 1. When the control elements 13 are located in the upper end sections 16 of the radial cams 14, the supports 7 are raised, as is illustrated in FIGS. 3 and 5. When the control elements 13 are located in the center sections 17 of the radial cams 14, the supports 7 are raised or lowered during a rotation of the control sleeve 12, depending on a direction of rotation. As a result of the offset of the center sections 17 in the circumferential direction, the supports 7 are raised and lowered individually and consecutively. If both supports 7 are lowered, as is shown in FIG. 1, first the support 7 including the large ring 8 and having the large insertion opening 10 is raised during rotation of the control sleeve 12, as is shown in FIGS. 2 and 4. When the control sleeve 12 is rotated further, the support 7 including the medium-sized ring 8 and the medium-sized insertion opening 10 is likewise raised, so that the medium-sized ring 8 is located in the larger ring 8, as is shown in FIGS. 3 and 5. As a result of further rotation, the smaller ring 8 having the smaller insertion opening is raised (not shown).

The control sleeve 12 is rotatably driven by an electric motor 18 by way of a gear wheel 19. The electric motor 18, the gear wheel 19 and the control sleeve 12 form the electromechanical support drive 11, which can be operated by way of a touch screen 20. The control sleeve 12 including the radial cams 14, and the control elements 13 projecting outwardly from the webs 9 of the supports 7 and engaging in the radial cams 14, form a cam control unit of the support drive 11 for raising and lowering the supports 7.

It is also possible, for example, to rotate the control sleeve 12 manually, which is to say a mechanical or manual support drive 11 without the electric motor 18 (not shown).

For the following description of FIGS. 6 to 11, reference is additionally made to the foregoing description of FIGS. 1 to 5, and elements in FIGS. 6 to 11 that coincide are denoted by the same reference numerals as in FIGS. 1 to 5.

Conversely to FIGS. 1 to 5, supports 7 are lowered for use in the holder 1 according to the invention shown in FIGS. 6 to 11, and are raised during non-use into a closed position. "Closed" means that upper end faces of the supports 7 and a bottom element 5 form a closed surface area, and are flush with a surrounding surface 6 of the holder 1, or a surrounding surface 6 of a center console 2 of a motor vehicle into which the holder 1 is installed.

Figure 7:
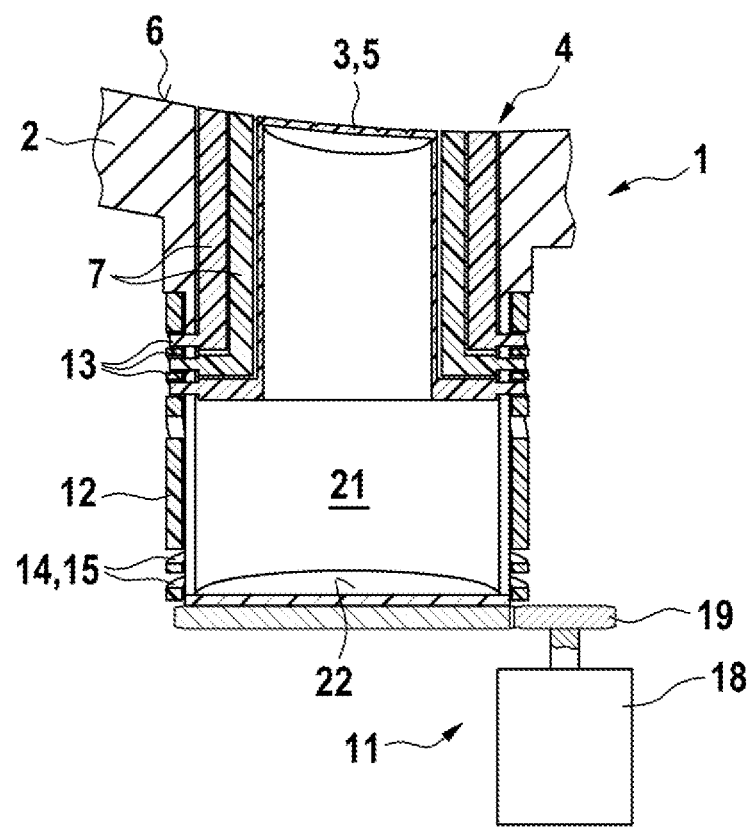
FIG. 7 shows an axial section of the holder from FIG. 6.
Figure 8:
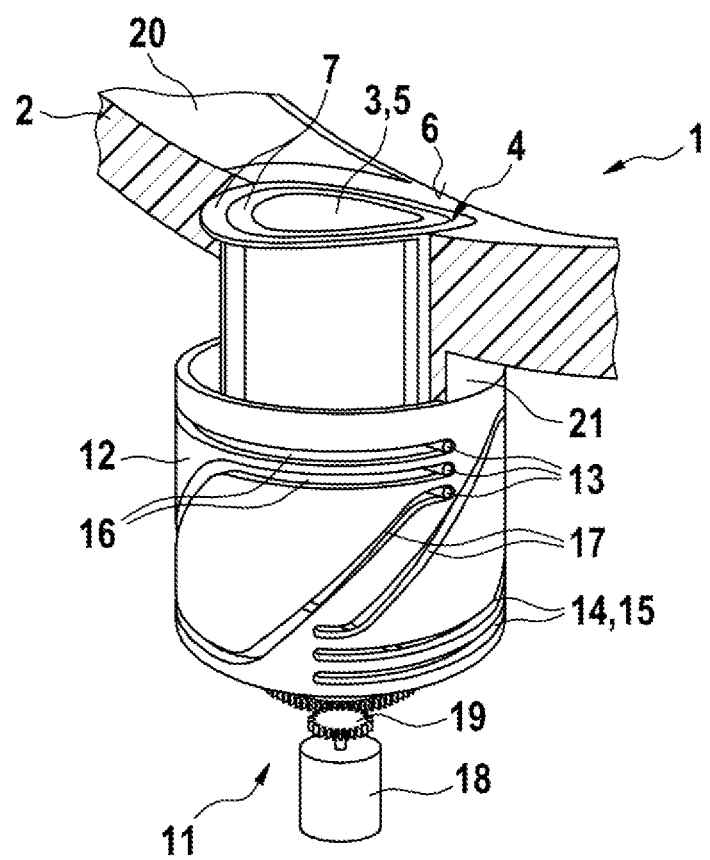
FIGS. 8 to 11 show the holder from FIGS. 6 and 7 in different positions.

The holder 1 from FIGS. 6 to 11 includes two supports 7 for a beverage container (not shown), such as a cup, a beverage can, a bottle or a mug, which, as is readily apparent from FIG. 7 and has already been mentioned above, are implemented in the exemplary embodiment as cylindrical tubes disposed concentrically inside one another. A foot 3, which, in contrast to FIGS. 1 to 5, is not fixed in FIGS. 6 to 11, but similarly to the supports 7 can be lowered from the closed position, shown in FIGS. 6, 7 and 8, and raised into the closed position, is located concentrically within the two supports 7. In other words, the supports 7 and the foot 3 are axially movable. The foot 3 is likewise in a cylindrical tube-shape and closed at the top, whereby the upper side thereof forms a bottom element 5, onto which the beverage container (not shown) can be placed. Ends of the supports 7 that are open at the top form differently sized insertion openings 10, or insertion openings 10 having different diameters, for inserting a beverage container, which is not shown. The holder 1 from FIGS. 6 to 11 can also include more than two supports 7 (not shown). The holder 1 is in a non-usage position in FIGS. 6 and 7, while the usage position of the holder 1 is illustrated in FIGS. 8 to 11. The individual supports 7 can be lowered equally far into the usage positions. This is illustrated particularly clearly in FIG. 11, in which the bottom element 5 ends flush with an upper edge of the respective supports 7, whereby a stable bearing surface for the beverage container is additionally formed. As mentioned, the supports 7 are implemented as cylindrical tubes, which form full-surface-area cylindrical supporting surfaces for the beverage container. Here as well, as in the case of the first exemplary embodiment, an effective supporting surface is stepless and formed in each case by only one of the supports 7, and more particularly by the support 7 which, in the respective usage position, has the smallest inside diameter, which is apparent when viewing FIGS. 8 to 11. The supports 7 form a supporting surface that is completely closed across the full surface area which, in the usage position, projects from the lowered bottom element 5 to the upper edge of the respective support 7 that is not lowered. This is illustrated particularly clearly in FIG. 11. The insertion opening 10 is thus substantially gap-free, so that no foreign bodies can fall through the insertion opening 10 into the interior of the holder 1. Foreign bodies would be held back by the bottom element 5 and the upper edge of the respective supports 7.

The holder 1 from FIGS. 6 to 11 includes a cylindrical tube-shaped housing 21 including a bottom 22, which projects downwardly from the center console 2 and, at the top, opens with a hole 4 into the center console 2. The housing 21 is enclosed by a cylindrical tube-shaped control sleeve 12 that can be rotated about the axis thereof and includes radial cams 14 for the two supports 7 and for the foot 3. As in FIGS. 1 to 5, the radial cams 14 are slots, wherein a design of the radial cams 14 as slots is not mandatory for the invention. For example, grooves or webs can also be used as radial cams (not shown). As in FIGS. 1 to 5, the radial cams 14 of the control sleeve 12 of the holder 1 from FIGS. 6 to 11 include lower and upper end sections 15, 16, which extend in the circumferential direction and are connected by oblique, or more precisely helical, center sections 17. The center sections 17 of the radial cams 14 are offset from one another in the circumferential direction of the control sleeve 12. Tenons, which project outwardly from the supports 7 and the foot 3, serve as control elements 13 and engage in the radial cams 14, so that, as was described with respect to FIGS. 1 to 5, the supports 7 and the foot 3 can be lowered and raised by a rotation of the control sleeve 12.

Figure 9:
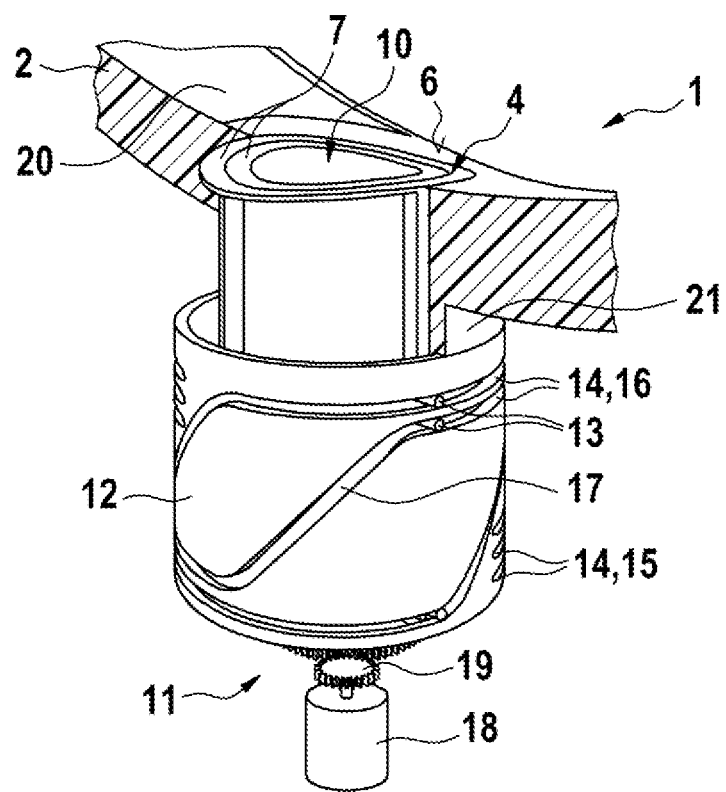
Figure 10:
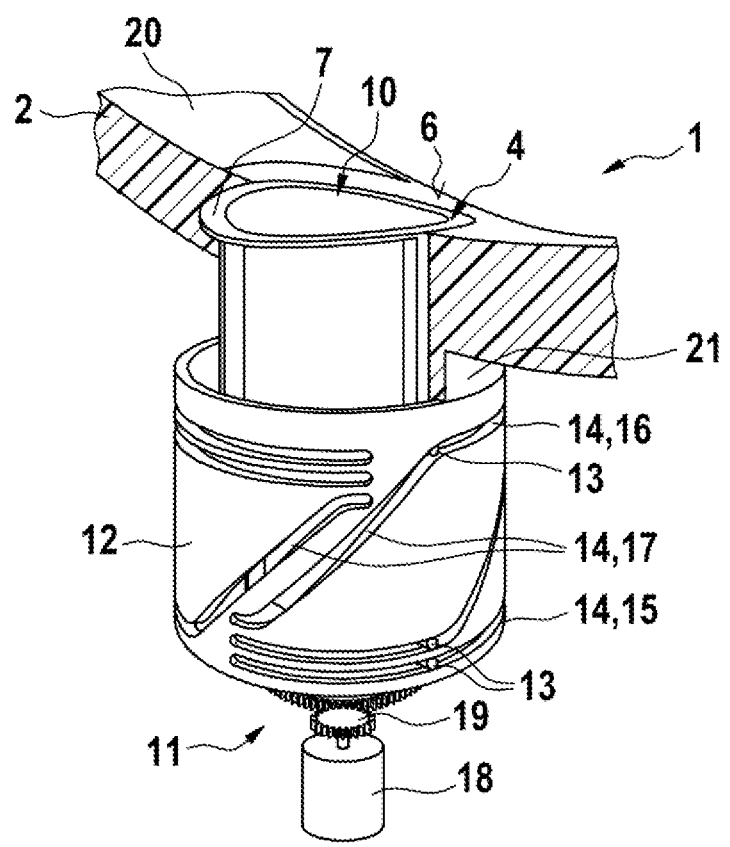
Figure 11:
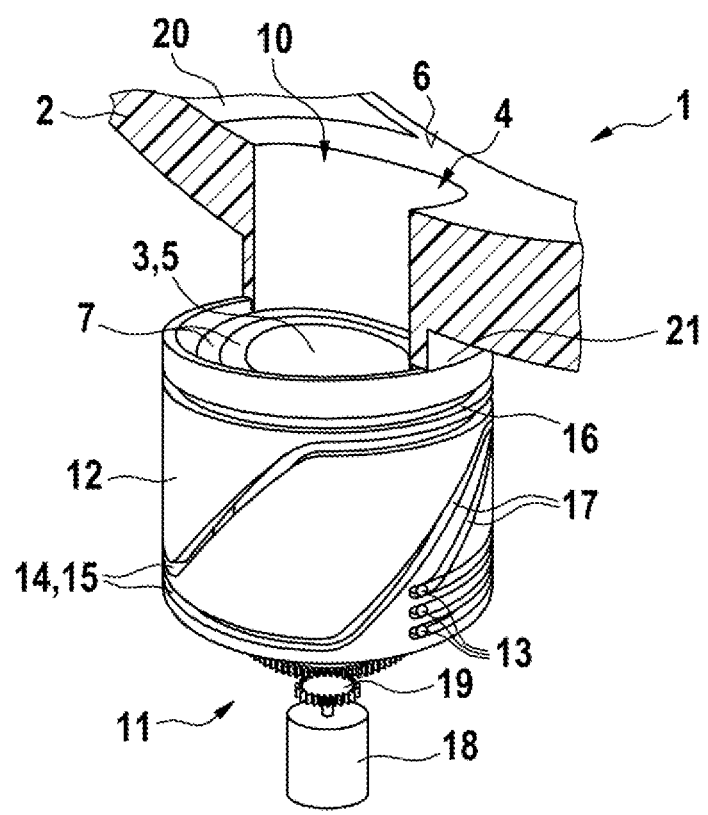

When the control elements 13 of the supports 7 and of the foot 3 are located in the end section 15, 16 of the respective radial cam 14 thereof, the supports 7 and the foot 3 do not move during rotation of the control sleeve 12. When the control elements 13 are located in the center section 17 of the respective radial cam 14, the supports 7 and the foot 3 are lowered during rotation of the control sleeve 12 in one direction, and raised during rotation of the control sleeve 12 in the opposite direction. The center sections 17 of the radial cams 14 are offset in the circumferential direction such that the supports 7 and the foot 3 move consecutively, and more particularly, proceeding from the closed position shown in FIGS. 6 to 8, first the foot 3, including the bottom element 5, is lowered on the upper side thereof. This position is shown in FIG. 9. When the control sleeve 12 is rotated further, the support 7 having the smaller diameter and the smaller insertion opening 10 for the beverage container is lowered, after the foot 3, and when the control sleeve 12 is rotated further, the support 7 having the larger diameter and the larger insertion opening 10 is lowered last. The position of the holder 1 in which the foot 3 is lowered and the smaller or inner support 7 is lowered is shown in FIG. 10, and the position in which the foot 3 and the two supports 7 are lowered is shown in FIG. 11. During reverse direction rotation of the control sleeve 12, the foot 3 and the two supports 7 are raised again in the reverse order, which is to say first the outer support 7, then the inner support 7, and finally the foot 3. In this way, it is possible to place beverage containers having different diameters into the holder 1 and to laterally support these in a tilt-proof manner. Offsetting the control elements 13 in the circumferential direction would also make it possible to consecutively lower and raise the supports 7 and the foot 3 in the desired order (not illustrated).

As in FIGS. 1 to 5, a rotary drive of the control sleeve 12 by way of an electric motor 18 using a gear wheel 19 is also provided in the holder 1 from FIGS. 6 to 11, which is to say an electromechanical support drive 11. Operation by way of a touch screen 20 is likewise provided. In principle, manual rotation of the control sleeve 12 is likewise possible (not illustrated). The control sleeve 12 including the radial cams 14, and the control elements 13 engaging in the radial cams 14, form a cam control unit for lowering and raising the two supports 7 and the foot 3. Conversely, arrangement of the radial cams 14 at the supports 7 and the foot 3, and arrangement of the control elements 13 at the (inside of the) control sleeve 12 are also conceivable, as is a combination of radial cams 14 and control elements 13 at the supports 7, the foot 3 and the control sleeve 12 (both not shown).

LIST OF REFERENCE NUMERALS

Holder for a Beverage Container 1 holder
2 center console
3 foot
4 hole
5 bottom element
6 surface
7 support
8 ring
9 web
10 insertion opening
11 support drive
12 control sleeve
13 control element
14 radial cams
15 lower end section
16 upper end section
17 center section
18 electric motor
19 gear wheel
20 touch screen
21 housing
22 bottom

The invention claimed is:

1. A holder for a beverage container, comprising a bottom element onto which the beverage container can be placed, and comprising a plurality of height-adjustable supports, which include differently sized, mutually overlapping insertion openings, through which the beverage container can be placed, onto the bottom element so that the supports enclose the beverage container, wherein the holder comprises a support drive , which consecutively raises the supports for setting a usage position in the order of the sizes of the insertion openings thereof above the bottom element and/or lowers these to the bottom element, so that the support having the smallest insertion opening raised above the bottom element laterally supports the beverage container placed into the insertion opening and onto the bottom element.

2. The holder according to claim 1, wherein the supports are tubular or annular.

3. The holder according to claim 1, wherein the support drive comprises a cam control unit for raising and/or lowering the supports.

4. The holder according to claim 3, wherein the cam control unit comprises a control sleeve which encloses the insertion openings and can be rotated about an axis extending through the insertion openings.

5. The holder according to claim 1, wherein the supports, together with the bottom element, form a closed surface area when the insertion openings thereof are located at the same height as the bottom element.

6. The holder according to claim 1, wherein the holder comprises an electromechanical support drive.

7. The holder according to claim 1, wherein each of the supports can be raised or lowered equally far into the usage position.

8. The holder according to claim 1, wherein each of the individual supports alone forms the supporting surface in the respective usage position.

9. The holder according to claim 8, wherein the supports, in the respective usage position, form a supporting surface that extends from the bottom element to an upper edge of the respective support.

10. The holder according to claim 9, wherein the insertion opening is substantially gap-free in the usage positions.

* * * * *